United States Patent [19]

Ward et al.

[11] 4,143,115
[45] Mar. 6, 1979

[54] CHEMICAL GENERATION APPARATUS

[75] Inventors: William J. Ward, Lenexa; Kenneth E. Gasper, Overland Park, both of Kans.

[73] Assignee: Olin Corporation, New Haven, Conn.

[21] Appl. No.: 767,915

[22] Filed: Feb. 11, 1977

Related U.S. Application Data

[63] Continuation-in-part of Ser. No. 651,685, Jan. 23, 1976, Pat. No. 4,013,761.

[51] Int. Cl.² .......................... B01J 7/02; C01B 11/02
[52] U.S. Cl. .................................. 422/113; 422/224; 422/241; 137/604; 137/605; 137/606
[58] Field of Search ................. 23/283, 282, 260, 285, 23/253 A, 252 A; 137/3, 604–606; 138/37, 39; 423/477; 285/177

[56] References Cited

U.S. PATENT DOCUMENTS

| | | | |
|---|---|---|---|
| 1,605,749 | 11/1926 | McCarthy | 134/36 X |
| 2,526,286 | 10/1950 | Schwarzkopf et al. | 134/36 X |
| 2,776,284 | 1/1957 | Hood | 23/260 X |
| 2,881,052 | 4/1959 | Julien et al. | 23/282 X |
| 3,502,443 | 3/1970 | Westerlund | 23/260 X |
| 3,816,077 | 6/1974 | Fuller et al. | 23/260 |

*Primary Examiner*—Morris O. Wolk
*Assistant Examiner*—Michael S. Marcus
*Attorney, Agent, or Firm*—William A. Simons; Thomas P. O'Day

[57] ABSTRACT

An improved chemical generation apparatus particularly adapted to the generation of chlorine dioxide. This apparatus includes a generation vessel having at least two reducing couplings attached thereto by leak-proof joints thereby forming at least one inlet and at least one outlet to said vessel. The reducing couplings advantageously have surfaces which form an angle of at least 110° with the vessel walls to create a geometry which prevents chemical buildup during operation of the apparatus. The apparatus also has sources of supply for each of the reactive materials connected to said inlet of the vessel though a metering means and an injection check valve.

2 Claims, 2 Drawing Figures

CHEMICAL GENERATION APPARATUS

CROSS-REFERENCE TO RELATED APPLICATIONS

This application is a continuation-in-part application of U.S. Patent Application Ser. No. 651,685, filed on Jan. 23, 1976 by the present inventors, and entitled "Chlorine Dioxide Generation" and now U.S. Pat. No. 4,013,761.

BACKGROUND OF THE INVENTION

1. Field of the Invention

This invention relates to an improved apparatus for the generation of chemicals such as chlorine dioxide.

2. Description of the Prior Art

Chlorine dioxide is utilized in a variety of bleaching processes, and in a large number of bactericidal applications, e.g., in the fields of water treatment, odor abatement, phenol destruction and the like. Due to the unstable nature of gaseous chlorine dioxide when compressed, it is necessary to produce chlorine dioxide at its location of use rather than to produce it at a plant and ship it for use. A common technique involves the production of chlorine dioxide in a generator by reaction of various starting materials and then feeding the generated chlorine dioxide, e.g., in an aqueous solution, to the material or system to be treated.

In general, prior art apparatus for the generation of chemicals such as chlorine dioxide have been constructed of large diameter glass or plastic tubing and have flange arrangements which usually involve bolted fittings and fixtures for inlet and outlet attachment. See, for example, Pennwalt Corporation sales brochure entitled "Chlorine Dioxide Generator, Series A-709", Wallace & Tiernan Division, Belleville, N.J., Cat. File 60.310, June 1970. While these generators are reasonably reliable in the field, they are prone to leakage and require periodic inspection and occasional repair with concomitant time loss and expense. Additionally, these generators usually have flat flanges which form 90° angles with the tubing walls and which thereby create pockets into which a buildup of potentially hazardous gases may occur. Not only does this buildup result in a loss of material and therefore a possibly irregular generation of chemicals, but there is some speculation, in connection with the use of such apparatus in generating chlorine dioxide, that a buildup of chlorine dioxide in these pockets might create an explosion hazard.

BRIEF SUMMARY OF THE INVENTION

The present invention, therefore, is directed at an improved apparatus for generating chemicals such as chlorine dioxide whereby the problems of the prior art apparatus are overcome. This apparatus, in general, includes a generation vessel having at least two reducing couplings attached thereto by leak-proof joints thereby forming at least one inlet and at least one outlet to the generation vessel. The reducing couplings advantageously have surfaces which form an angle of at least 110° with the vessel walls to create a geometry which prevents chemical buildup during operation of the apparatus. The generation vessel inlet or inlets formed by one or more reducing couplings are connected to sources of supply for each of the reactants through metering means and an injection check valve. With the present apparatus, leakage problems are significantly reduced, servicing requirements are likewise reduced, chemical buildup within the generator is essentially eliminated and the above-mentioned possible explosion hazard is obviated.

While the apparatus of the present invention has been shown to be particularly advantageous in the generation of chlorine dioxide, it may be also employed in the generation of other chemicals, for instance, $SO_2$ solution or chlorine water (i.e., hypochlorous acid solution). However, the following detailed description will be directed primarily to embodiments showing the production of chlorine dioxide, although it should be remembered that this apparatus is applicable for generating other chemicals wherein two or more reactants are brought into contact and reacted together to form a product.

DETAILED DESCRIPTION

The improved apparatus of the present invention includes generally a chemical generation vessel having defined reducing couplings attached thereto, starting material supply sources attached to at least one of the reducing couplings through metering means and injection check valves.

Figure 1:
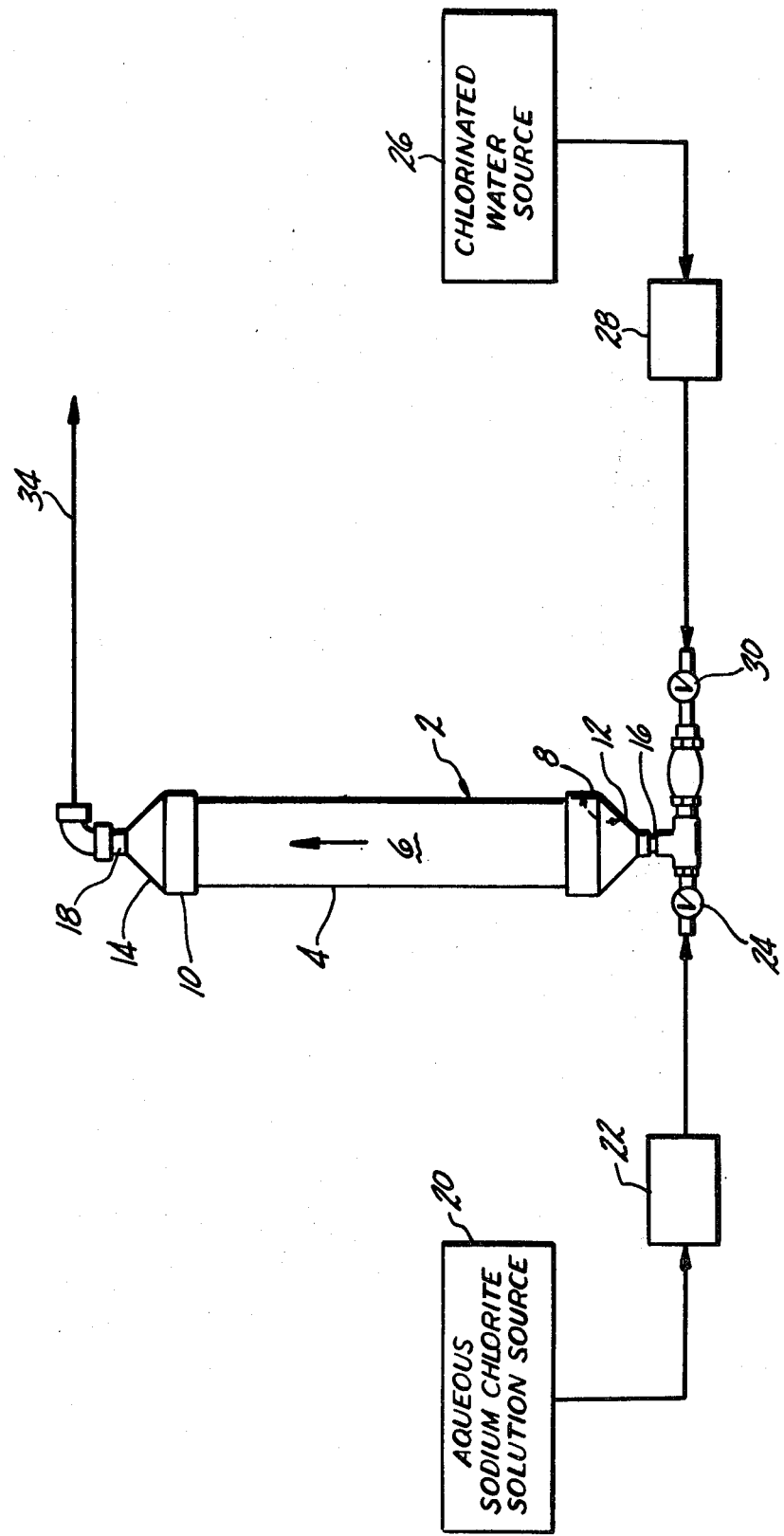
FIG. 1 illustrates an apparatus of the present invention showing a chlorine dioxide generation vessel in combination with a two starting material source system.
Figure 2:
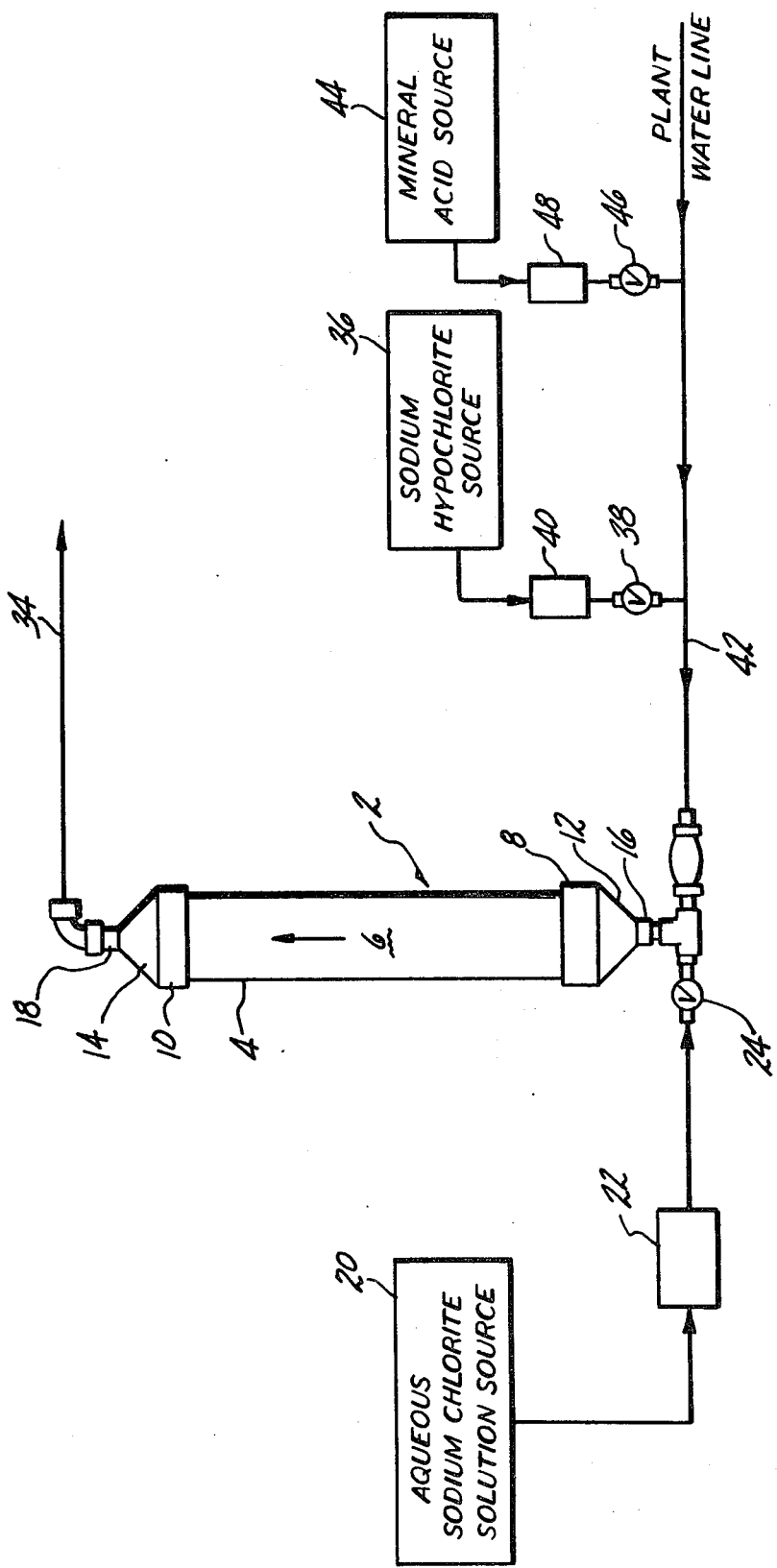
FIG. 2 illustrates an apparatus of the present invention showing a chlorine dioxide generation vessel in combination with a three starting material source system.

Referring to both FIGS. 1 and 2, wherein preferred embodiments of the present invention for producing chlorine dioxide are illustrated, the generation vessel 2 preferably has an internal surface made of an oxidizing agent-inert material, more preferably plastic material, and has walls 4 which define a confined space 6 for fluid flow in an overall mean flow direction approximately parallel to the vessel walls. This is shown by the vertical arrow in space 6. By plastic material is meant any material which may be joined with itself by the well-known solvent welding or bonding techniques. Among these plastic materials are the synthetic materials which are inert to oxidizing agents attack and which may be solvent welded. Particularly useful are the high polymer resins and plastics such as polyvinyl chloride and the like. The choice of material is not critical although it is preferred that it be solvent weldable and be inert to the attack of oxidizing agents, as mentioned. Moreover, such materials are well within the knowledge of one of ordinary skill in the art and are available commercially.

The generation vessel walls 4 may be of any geometry desired as long as no pockets or corners are created in the direction of overall flow of fluid in the vessel which would create detrimental chemical buildup. The walls 4 may have a rectangular cross-section or a circular cross-section or any other configuration subject to the preceding proviso. A particularly advantageous geometry for the vessel walls 4 is a simple circular cross-section, i.e., cylindrical vessel as illustrated in the drawings.

An important aspect in the geometry of the generator vessel 2 involves the avoidance of problematic pockets and the increased mixing capabilities by employing reducing couplings 8 and 10 at each end of the vessel walls 4 to form an inlet 16 and an outlet 18. These couplings 8 and 10 may also be made of plastic material such as polyvinyl chloride and are advantageously attached to walls 4 by solvent welding joints (not shown in the Figures). Couplings 8 and 10 have inwardly tapered surfaces 12 and 14 which reduce the cross-sectional area of the confined space 6. Surfaces 12 and 14 form angles of at least 110° and preferably at least 125°, with the walls 4 as shown by the dotted lines in FIG. 1. The formation of angles this size, or greater, between the vessel walls 4 and the reducing surfaces 12 and 14 of the couplings 8 and 10, respectively, assures that no pocket areas are created near the inlet 16 and outlet 18.

In the apparatus of the present invention as shown in FIGS. 1 and 2, the inlet 16 of the generation vessel 2 has connected to it the sources of reactants 20 and 26 in the case of FIG. 1 and 20, 36 and 44 in the case of FIG. 2, which reactants when combined form the chlorine dioxide product. Since these reactants or starting materials are combined for the first time at the inlet 16 and the generation of the chemical product occurs within the vessel 2, some mode of mixing these reactants may be desirable. Thus, the reactor vessel 2 may optionally contain mixing means (not shown in the Figures) to enhance reaction completion and to enhance outlet solution homogeneity. The mixing means may be in the form of a motor-driven agitator or may be in the form of a screw-type configuration within the vessel 2 or other techniques may be used. These would include mixing material such as packing material, e.g., plastic or glass or ceramic saddles or rings, that may simply be placed within the vessel. It should be recognized that any mixing means may be employed as long as it is inert to the chemicals involved in the generation of the chemical product such as chlorine dioxide. Packing material is a preferred mixing means because it is simple and inexpensive.

Each reactant is supplied from its source to the generation vessel inlet via a metering means and an injection check valve. The latter, which can be of any suitable or conventional type, serves to prevent back flow of the reactants. The metering means may also be of conventional structure or design for motivating the reactant, in predetermined amounts or rates of flow, from its source through the injection check valve and to the generation vessel inlet. For example, the metering means can be a conventional, gas, electric or gravity-type flow-regulated pumping system.

Thus by reference to FIG. 1, reactant source 20 is connected to metering means 22 which is connected to injection check valve 24, the latter being in turn connected to generation vessel inlet 16; and reactant source 26 is connected to metering means 28 which is connected to injection check valve 30, that is in turn connected to the generation vessel inlet 16. A similar arrangement is provided in FIG. 2 for supplying the three reactants to the generation vessel. Thus, reactant source 20 is connected to metering means 22 which is connected to injection check valve 24, the latter being in turn connected to generation vessel inlet 16; reaction source 36 is connected to metering means 40 which is connected to injection check valve 38 which in turn is connected to generation vessel inlet 16 via plant line 42; and reactant source 44 is connected to metering means 48 which is connected to injection check valve 46, the latter in turn is also connected to vessel inlet 16 via plant line 42.

In one preferred embodiment of the present invention, which is represented by FIG. 1, an aqueous solution of chlorine dioxide is produced by reacting an aqueous sodium chlorite solution source 20 with a chlorinated water source 26. The aqueous sodium chlorite source 20 is connected to injection check valve 24 at inlet 16 via metering means 22. Chlorinated water source 26 is likewise connected to the generation vessel 2 through injection check valve 30 and metering means 28. Outlet 18 is shown connected to a line 34 for transmission of the chlorine dioxide generated in an aqueous solution to the water system to be treated.

The chlorinated water source 26 may be a commercially available chlorinator and may use water from the water system to be treated with chlorine dioxide. For this reason, an optional filter (not shown in the FIG. 1) may be employed to maintain the generation vessel 2 free of detrimental impurities. Usually, the pH of the chlorinated water source 26 should be from about 2 to about 9, and preferably about 3.0 to about 4.5. A minimum of about 300 mg/l, and preferably about 1,000 to about 1,500 mg/l of chlorine, is normally necessary to maintain a pH of no greater than about 4.5, and preferably between about 3.0 and about 4.5. The chlorinated water and the aqueous sodium chlorite solution are combined in the vessel in regulated proportions by the above-mentioned metering means so that about 0.2 to about 1.2 moles of hypochlorous acid (active ingredient in the chlorinated water), and preferably about 0.4 to about 0.6 moles of hypochlorous acid, is used per mole of sodium chlorite.

In another preferred embodiment of the present invention, which is represented by FIG. 2, an aqueous sodium chlorite solution source 20 is reacted with the combination of a sodium hypochlorite source 36 and a mineral acid source 44. Portions of FIG. 2 which are identical to those shown in FIG. 1 are identically numbered. Aqueous sodium chlorite solution source 20 is connected to injection check valve 24 at inlet 16 via metering means 22. Sodium hypochlorite source 36 is connected to injection check valve 38 via metering means 40. Injection check valve 38 connectes the sodium hypochlorite source feed line to inlet 16 via plant water line 42. Mineral acid source 44 is connected to injection check valve 46 via metering means 48 and the mineral acid feed line is connected to inlet 16 via plant water line 42. Plant water line 42 is used to supply diluent water to the generation vessel 2 and to pick up both the mineral acid and the sodium hypochlorite as it is being fed to the generation vessel inlet 16. Outlet 18 is shown connected to line 34 for transmission of the chlorine dioxide generated to the water system to be treated in the form of an aqueous solution.

The sodium hypochlorite source 36 generally contains sodium hypochlorite in an aqueous solution having about 2% to about 30%, preferably about 10% to about 25%, by weight of the hypochlorite based on the total weight of the solution. Reactants functionally equivalent to sodium hypochlorite may, of course, be substituted without exceeding the scope of the present invention, as is the case with other reactants described herein. The mineral acid source 44 may contain sulfuric acid or it may contain a hydrohalic acid. Preferred is hydrochloric acid. Generally, the mineral acid is in an aqueous solution containing about 5% to about 98%, preferably about 20% to about 30%, by weight of mineral acid based on the total weight of the solution. In this embodiment, the sodium hypochlorite solution is combined with the mineral acid and the aqueous sodium chlorite solution at a rate so that about 0.4 to about 1.0 moles, and preferably about 0.6 to about 1.0 moles, of sodium hypochlorite is combined with each mole of sodium chlorite. The mineral acid is combined with the other starting materials so that about 0.1 to about 1.0 moles, and preferably about 0.3 to about 0.7 moles of the mineral acid is added per mole of sodium chlorite.

In either of the above embodiments, and in any variations thereon, an optional water source may be included in the system. This water source (shown in FIG. 2) may be employed to dilute the reactants and the generated chlorine dioxide as desired. Thus, where the water from the various aqueous starting materials is adequate, an additional water source is not necessary. For example, when a chlorinated water source is employed, this water may be sufficient for optimal operation of the apparatus. On the other hand, a system employing relatively substantial concentrations of sodium hypochlorite and mineral acid may advantageously include an additional water source. In any event, it is desired that ultimately a mixture within the generation vessel will contain about 95% to about 99.9%, or even greater, and preferably about 98% to about 99.9%, by weight of water based on the total weight of the water and the starting materials.

As stated above, the apparatus of the present invention can be employed to generate chemicals other than chlorine dioxide. For example, the apparatus can also be used for the generation of aqueous $SO_2$ solution using aqueous solutions of sodium sulfide and hydrochloric acid as the two reactants. Also, chlorine water (i.e., aqueous hypochlorous acid solution) can be generated from aqueous solutions of sodium hypochlorite and hydrochloric acid as the two reactants.

The following examples described in conjunction with the drawings are presented to further illustrate the present invention. All percentages and proportions are by weight unless explicitly stated otherwise.

EXAMPLE A

The novel apparatus shown in FIG. 1 is used as follows:

A large U.S. Midwestern aluminum producer used cooling water to cool the mold box of their continuous casting machine as well as for normal cooling uses in their plant. As part of the continuous casting process, the cooling water also contacts the cast aluminum. About 10 to about 12 pounds of a vegetable oil-type lubricant was used to facilitate the removal of the casting from its mold. Cooling water, which comes in direct contact with the casting, became contaminated with between 10 and 60 mg/l of this oil and carried it to all parts of the cooling system. The vegetable oil lubricant, which has entered the cooling water, acted as a nutrient to encourge microbiological growth. Slime masses were evident on the tower fill and a septic odor was present near the cooling tower. Mechanical oil removal was designed into the plant but was not able to remove enough of the oil to prevent microbiological problems.

Heavy dosages of chlorine gases were used (by means of a chlorinator) but were unable to control the slime. A wide variety of non-oxidizing microbiocides were tried and also failed to control the growths. Combinations of chlorine and non-oxidizing microbiocides also proved ineffective. Manual cleaning of the tower during production shutdowns was necessary to recover some of the heat transfer capability. Even this gave only short-term relief due to heavy recontamination and a continuing resupply of nutrient from the oil.

Make-up water to this system was from a high quality potable water source. A typical analysis of the make-up water appears in Table I below. The recirculating water had a range of analyses similar to that presented in Table II below. The tower, a two-cell induced draft unit with a concrete basin, has a recirculating rate of approximately 4000 GPM and a temperature change of about 10° F. to 12° F. operating in the range of about 85° F. to 105° F. The system capacity was approximately 225,000 gallons (U.S.).

To correct these problems, chlorine dioxide was chosen for use in this system because it was less likely to react with the contaminating oils than was chlorine and it had a wider range of activity at higher system pHs. Chlorine dioxide was generated in solution at the jobsite in an apparatus such as is shown in FIG. 1. The effluent stream from the existing gas chlorinator was used as chlorinated water source 26 (FIG. 1). This chlorinated water contained about 1,000 ppm active chlorine and was fed to the generation vessel at a rate of about 3 GPM. A 25% (active) by weight sodium chlorite aqueous solution was fed to the generation vessel at a rate of about 1.5 GPH. At these flow rates, about 0.5 moles of active chlorine was combined with each mole of sodium chlorite. The hold-up volume of the generator was about 1 gallon of total solution. Chlorine dioxide formed instantaneously and was immediately taken into solution by the water stream. The $ClO_2$ solution was then injected into the cooling water at two points in the system.

As soon as the $ClO_2$ system was started, the septic odor in the area disappeared and was replaced by a sweet, faint chlorine odor. A $ClO_2$ residual was found by DPD test (diethyl p-phenylenediamine) in a few hours. The water became murky and it was necessary to clean the pump and cast house strainers at frequent intervals as large slime masses sloughed off. The underwater areas of the tower basin were the first to clean up, followed by the fill sections of the tower. During the clean-up portion of the program, heavy blowdown was necessary to rid the system of dead organic material. A scheduled production shutdown afforded the opportunity to manually clean the remaining debris from the system. When production was resumed, the $ClO_2$ dosage and frequency were reduced to a maintenance level, residuals were set at less than 1.0 mg/l of $ClO_2$ (DPD) for four hours per day on a daily basis. Non-oxidizing biocides were used on a weekly "slug" basis to control potentially resistant strains and to penetrate and disperse persistant slime masses.

This plant was operated for over seven months on the chlorine dioxide system and was found to be in excellent condition from a microbiological control standpoint. There were no operating problems due to microbiological growths and their attending heat transfer problems. Corrosion control was improved in this system because of the cleaner surfaces of the chlorine dioxide generation program. During the entire operation of the chlorine dioxide generation system, no chlorine dioxide or other chemical buildup was observed in the generation vessel and no leakage occurred.

TABLE I

| Typical Make-up Water Analysis | | |
|---|---|---|
| Constituent | Expressed As | mg/l |
| Total Hardness | $CaCO_3$ | 80 |
| Calcium Hardness | $CaCO_3$ | 40 |
| Magnesium Hardness | $CaCO_3$ | 34 |
| Total Iron | Fe | 1.2 |

TABLE I-continued

| Typical Make-up Water Analysis | | |
|---|---|---|
| Constituent | Expressed As | mg/l |
| pH | Units | 6.6 |
| TDS | NaCl | 100 |
| Total Alkalinity | $CaCO_3$ | 52 |
| Chloride | Cl | 25 |
| Silica | $SiO_2$ | 20 |

TABLE II

| Recirculating Water Analysis Range | | |
|---|---|---|
| Constituent | Expressed As | mg/l |
| Total Hardness | $CaCO_3$ | 80 – 120 |
| Calcium Hardness | $CaCO_3$ | 40 – 75 |
| Total Iron | Fe | 0.6 – 4.0 |
| pH | Units | 5.8 – 7.8 |
| Total Alkalinity | $CaCO_3$ | 10 – 65 |
| Chloride | Cl | 30 – 120 |
| Silica | $SiO_2$ | 20 – 35 |
| Total Organic Carbon | C | 10 – 60 |

EXAMPLE B

The novel apparatus shown in FIG. 2 is used as follows:

A large plant of a major meat-packing firm recovered blood solids from their meat-packing operations via a drying recovery operation. Liquid by-product blood was accumulated in batch tanks until a quantity sufficient for an economical drier run has been collected. The drier was then started up to recover the blood in solid form, evaporating the moisture to the atmosphere. Cyclones concentrated the dried blood solids. From the cyclones, the exhaust gases passed through a venturi scrubber and then into a packed counter-flow-type air scrubber. The air scrubber had an 800-gallon (U.S.) reservoir and recirculated the scrubber water at the rate of 350 GPM. Fresh water (plant supply) was used as make-up at the rate of 5 GPM. Ammonia levels as high as 1,000 mg/l were observed and averaged approximately 500 mg/l in the recirculating water. Hypochlorite solutions were used in an unsuccessful attempt to control the obnoxious odors present in the scrubber effluent gases.

To correct this situation, chlorine dioxide was chosen to replace hypochlorite because of its selective oxidant properties and because it would not react with the ammonia contamination known to be present. An apparatus such as that shown in FIG. 2 was chosen instead of the FIG. 1 type because a gas chlorinator, or chlorinated water, was unavailable at the site. An aqueous sodium chlorite solution containing 25% (active) sodium chlorite by weight, was used in starting material source 20. An aqueous sodium hypochlorite solution containing about 15% sodium hypochorite by weight was used in starting material source 36. A 30% concentration of hydrochloric acid solution was in mineral acid source 44. Plant water was pumped through line 42 at a rate of about 6 GPM, the hypochloric acid solution was fed to line 42 at a rate of about 0.25 GPH, and the sodium hypochlorite solution was fed to line 42 at a rate of about 0.5 GPH. The combined flow through line 42 was fed to generation vessel 4 via inlet 16 and the aqueous sodium chlorite solution was mixed therewith by being fed to inlet 16 at a rate of about 0.7 GPH. Thus, about 0.5 moles of sodium hypochlorite and about 0.5 moles of hydrochloric acid were combined with each mole of sodium chlorite. Chlorine dioxide was generated instantaneously and transmitted from the generation vessel via line 34 to the scrubber tower recirculating line. Total chlorine dioxide feed was estimated to be about 135 mg/l based on the recirculating water flow. A chlorine dioxide residual was observed by DPD measurement. A short time after the generator was started, a $ClO_2$ residual was observed but this excess seldom exceeded 2.0 mg/l during the run. After a short period of treatment with the chlorine dioxide, the offensive odors issuing from the air scrubber were replaced by a sweet, faint chlorine odor.

Microbial plant counts made before and during chlorine dioxide treatment indicated a sharp drop in the total number of microbial organisms. Prior to chlorine dioxide treatment, the water contained over 1,000,000 microorganisms per milliliter and within a few hours of chlorine dioxide treatment contained less than 1,000 microorganisms per milliliter. The chlorine dioxide generation technique proved to be an effective means of controlling offensive odor and microbiological counts in this blood solids recovery plant. No chlorine dioxide or other chemical buildup was observed in the generation vessel during the entire operation and no leakage occurred.

What is claimed is:

1. An apparatus comprising:
   (a) a cylindrical chlorine dioxide generation vessel, the inner surfaces of said vessel being made of polyvinyl chloride, fluid-mixing means within said generation vessel, and said vessel having walls defining a confined space for fluid flow in an overall mean flow direction approximately parallel to said walls;
   (b) at least two reducing couplings, the inner surfaces of said couplings being made of polyvinyl chloride, at least one of said couplings being located at one end of said vessel and attached to said walls to form an inlet and at least one other of said couplings being located at the other end of said vessel and attached to said walls to form an outlet, said couplings being attached to said vessel walls by solvent-weld and having surfaces which reduce the cross-sectional area of said confined space defined by said vessel walls, said coupling surfaces forming an angle of at least 110° with said vessel walls;
   (c) a first injection check valve connected to said inlet;
   (d) an aqueous sodium chlorite solution source;
   (e) metering means connecting said aqueous sodium chlorite solution source to said injection check valve;
   (f) a second injection check valve connected to said inlet;
   (g) a chlorinated water source, said chlorinated water having a pH between about 2 and about 9;
   (h) metering means connecting said chlorinated water source with said second injection check valve, and
   (i) an additional water source connected to said inlet.
2. An apparatus comprising:
   (a) a cylindrical chlorine dioxide generation vessel, the inner surfaces of said vessel being made of polyvinyl chloride, fluid-mixing means within said generation vessel, and said vessel having walls defining a confined space for fluid flow in an overall mean flow direction approximately parallel to said walls;
   (b) at least two reducing couplings, the inner surfaces of said couplings being made of polyvinyl chloride, at least one of said couplings being located at one end of said vessel and attached to said walls to form an inlet and at least one other of said couplings being located at the other end of said vessel and attached to said walls to form an outlet, said couplings being attached to said vessel walls by solvent-weld and having surfaces which reduce the cross-sectional area of said confined space defined by said vessel walls, said coupling surfaces forming an angle of at least 110° with said vessel walls;
(c) a first injection check valve connected to said inlet;
(d) an aqueous sodium chlorite solution source;
(e) metering means connecting said aqueous sodium chlorite solution source to said injection check valve;
(f) a second injection check valve connected to said inlet;
(g) an aqueous sodium hypochlorite solution source;
(h) metering means connecting said aqueous sodium hypochlorite solution source with said second injection check valve;
(i) a third injection check valve connected to said inlet;
(j) a mineral acid source;
(k) metering means connecting said mineral acid source to said third injection check valve; and
(l) an additional water source connected to said inlet.

* * * * *